Patented Dec. 6, 1927.

1,651,666

UNITED STATES PATENT OFFICE.

HYYM E. BUC, OF ROSELLE, NEW JERSEY, ASSIGNOR TO STANDARD DEVELOPMENT COMPANY, A CORPORATION OF DELAWARE.

PROCESS OF MAKING ESTERS.

No Drawing.    Application filed December 22, 1922.   Serial No. 608,569.

My invention relates to the art of making esters, and will be fully understood from the following description.

In the customary practice of making esters, the reaction components, alcohol and organic acid, are heated with a large proportion of sulfuric acid. Such procedure not only has marked operating limitations, but when it is attempted to esterify secondary alcohols in this manner the result is extensive decomposition. A process by which even the readily decomposed secondary alcohols can be successfully esterified with good yield is accordingly highly desirable.

In proceeding according to my invention, the alcohol and acid to be esterified are brought into reaction in the presence of an agent that is a better solvent of the ester formed than it is of the contributing constituents or water, and which is capable of stratifying in a separate layer. For convenience this agent will be referred to as a "selective solvent." As such agent there may be advantageously employed for instance hydrocarbons of the open or closed chain series and of suitable boiling point to allow separation of the ester by fractional distillation. An example of an agent which is available, especially in working with higher alcohols, is a petroleum white oil product which is highly refined, being colorless, odorless and tasteless, boiling above 300° C., and having a gravity around 28° or 29° Bé. Less highly refined products can be used, but are less desirable.

The esterification constituents are mixed in suitable proportion, generally with an excess of one or the other, governed somewhat with reference to which is the more valuable. Along with the esterification constituents, a small amount of concentrated sulfuric acid is added, about 1 to 5 or 6%, this having some catalytic value and contributing to a good layer separation by promoting specific gravity difference. The selective solvent is added in proportions which may vary between 25 and 100%, but which in general may advantageously be about equal in volume to that of the reaction constituents. On allowing to stratify, the selective solvent separates as a top layer above the reaction mixture. To accelerate the reaction, gentle heat is advantageous, for example 50-70° C., and stirring from time to time is also desirable. As the reaction proceeds, the ester is taken up by the selective solvent and the water of esterification remains in the lower layer. When the selective solvent is well saturated, it is drawn off and the ester is separated by distillation. By supplying further quantities of materials as necessary, the process may be carried on in continuous manner. The following illustrative examples may be noted.

I. A mixture was made up of 25 parts, by volume, of substantially anhydrous secondary butyl alcohol, $CH_3.CHOH.CH_2.CH_3$, 20 parts of glacial acetic acid and from one to five parts of concentrated sulfuric acid, and 53 parts of a highly refined white oil derived from petroleum, and having an initial boiling point of 300° C., and a gravity of 28.5° Bé. The mixture was maintained at a temperature of 50-60° C. and was stirred from time to time. On allowing to stratify after three hours the upper layer was drawn off and the butyl acetate was separated by distillation.

II. A mixture was made up of 150 parts, by volume, of methyl-normal propyl-carbinol, $C_3H_7.CHOH.CH_3$, 100 parts of glacial acetic acid, 5 parts of sulfuric acid, and 250 parts of a highly refined white oil derived from petroleum, and having an initial boiling point of 300° C., and a gravity of 28.5° Bé. The reaction was then conducted as in the foregoing example.

Aside from the esterification constituents mentioned above, various other acids and alcohols, or poly-hydroxy compounds may be used.

While in describing my invention, I have referred to certain specific examples of procedure, usages, etc., it will be understood that this is illustrative and not limitative. On the contrary the invention is to be regarded as limited only as defined in the following claims in which it is my intention to claim all inherent novelty as broadly as the prior art permits.

I claim—

1. The process of making secondary butyl acetate, which comprises adding to secondary butyl alcohol and glacial acetic acid, a small percentage of concentrated sulfuric acid and a highly refined white petroleum oil boiling above 300° C., and having a gravity of about 28-29° Bé., warming the mixture, stirring from time to time, allowing to stratify and finally separating the secondary butyl acetate product.

2. The process of making oil-soluble esters, which comprises warming an alcohol and an acid in the presence of a small percentage of sulfuric acid and a highly refined white petroleum oil boiling above 300° C., and having a gravity of about 28-29° Bé.

3. The process of making oil-soluble esters, which comprises conducting the reaction between an alcohol and an acid in the presence of a refined petroleum oil of high boiling point.

4. The process of making esters, which comprises conducting the reaction between an alcohol and an acid in the presence of a hydrocarbon of higher boiling point than that of the reaction constituents or ester produced and adapted to form a separable stratum containing said ester.

5. The process of making esters, which comprises conducting the reaction between an alcohol and an acid in the presence of a hydrocarbon adapted to form a separable stratum in which the ester produced is more soluble than are the reaction components and water.

6. The process of making esters, which comprises conducting the reaction between an alcohol and an acid in the presence of an agent which is a better solvent of the ester product than of the esterification constituents and which has a boiling point above that of the ester product or the constituents.

7. The process of making esters, which comprises conducting the reaction between an alcohol and an acid in the presence of an agent which is a selective solvent of the ester product.

HYYM E. BUC.